Figure 1:
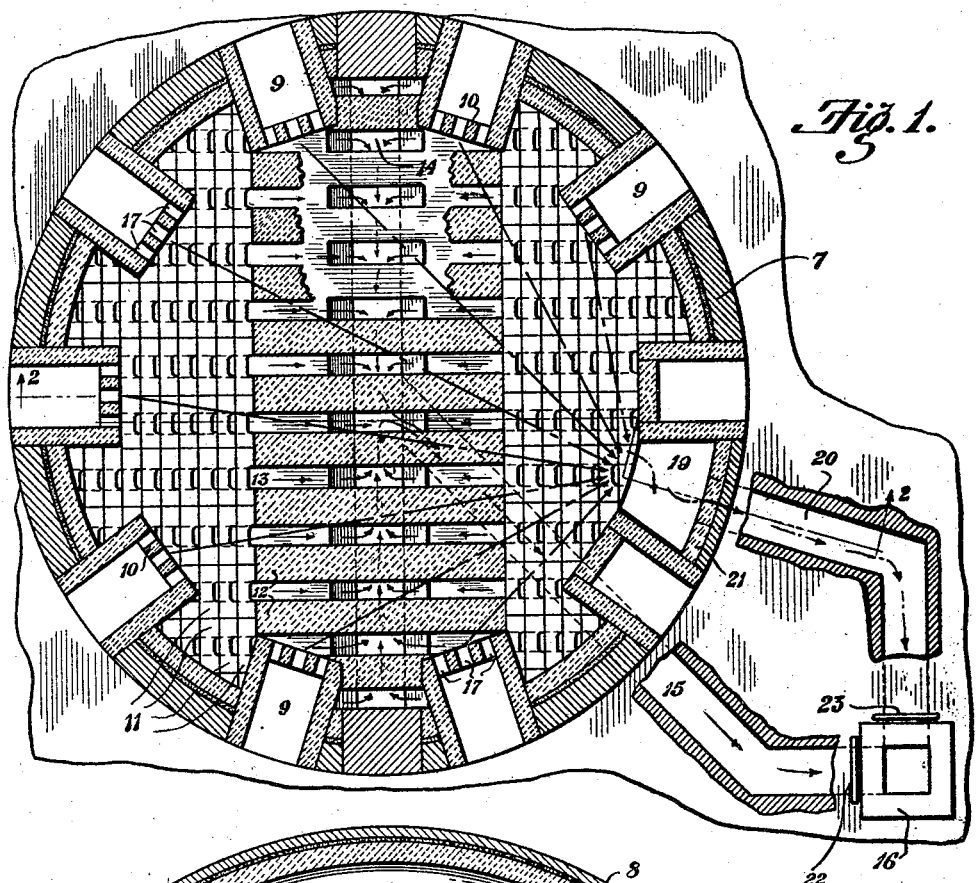

Sept. 28, 1926. 1,601,028
P. J. LENGSHOLZ
DOWNDRAFT KILN AND METHOD OF OPERATING THE SAME
Filed April 10, 1924    3 Sheets-Sheet 1

Inventor
P. J. Lengsholz.
By Frease and Bond
Attorneys

Sept. 28, 1926. 1,601,028
P. J. LENGSHOLZ
DOWNDRAFT KILN AND METHOD OF OPERATING THE SAME
Filed April 10, 1924 3 Sheets-Sheet 2

Inventor
P. J. Lengsholz.
By Freast and Bond
Attorneys

Sept. 28, 1926.　　　　　　　　　　　　1,601,028
P. J. LENGSHOLZ
DOWNDRAFT KILN AND METHOD OF OPERATING THE SAME
Filed April 10, 1924　　3 Sheets-Sheet 3

Inventor
P. J. Lengsholz.

Patented Sept. 28, 1926.

1,601,028

UNITED STATES PATENT OFFICE.

PETER JOSEPH LENGSHOLZ, OF MASSILLON, OHIO.

DOWNDRAFT KILN AND METHOD OF OPERATING THE SAME.

Application filed April 10, 1924. Serial No. 705,491.

The invention relates to kilns of the down draft type for burning bricks and other clay products; and the object of the improvement is to change the construction of such kilns to increase the efficiency and improve the products thereof.

Down draft kilns generally include a series of fire boxes built in or external to the walls of the kiln, a series of baffles or bag walls built upward a certain distance from the floor adjacent to the wall of the kiln on the inner side of each fire box to deflect part or all of the products of combustion to the top of the kiln; with a floor system including series of floor bricks forming openings leading down into a series of sub-flues which in turn lead to an underlying diametric main flue, which in turn leads by a tunnel to a stack extending upward to a considerable height above the top of the kiln, so as to induce a substantial draft from the bottom of the kiln.

Such kilns are charged by setting bricks or other clay products in tiers, rows, or stands upon the floor of the kiln, extending upward to or near the crown or top thereof; and the contents of the kiln are staggered or spaced apart so as to form openings of various sizes and courses for permitting the products of combustion to pass downward from the top of the kiln through the charge and the floor thereof, to and through the flues and tunnel to and upward through the stack thereof.

In the operation of such kilns, the charge is gradually heated from the top downward, and the moisture arising from the drying of the green or unburnt clay products, condenses and adheres to the surface thereof; and as the products of combustion pass downward from the hotter top toward the cooler bottom of the charge, the unburnt carbon deposits on the moist surfaces of the charge, and partially or entirely closes the openings therein, thus preventing the free flow of heating gases downward through the charge.

This condition continues until the lower portion of the charge is heated by conduction, if not by convection, to a sufficient temperature to burn out the carbon deposit and free the openings for a full flow of heating gases from the top to the bottom of the charge.

The detention of the draft caused by the deposit of moisture and carbon, and the fact that the charge is not uniformly dried and heated from the top to the bottom, results in products of varying color and degrees of hardness, according to their position or location in the kiln.

The same difficulties not only cause an increase in the amount of fuel, but in the length of time consumed in burning a charge; and sometimes result in an overburning of the charge in the upper part of the kiln or an underburning of the contents in the bottom of the kiln, and requires a careful separation of the products according to the differential color and hardness thereof.

These difficulties are overcome to a greater or lesser extent by so constructing, arranging and operating a down draft kiln, as to positively direct a substantial transverse or cross draft, as distinguished from a down draft through the openings in the charge, and especially in the lower portion thereof, during the first portion of the burning period, until the charge is completely dried and heated to a temperature which prevents any clogging or closing of the openings therein; after which the kiln may be operated so as to produce a down draft, either with or without a cross draft, during the remainder of the period required for properly and uniformly burning the charge.

The invention is illustrated in the accompanying drawings forming part hereof, in which—

Figure 2:
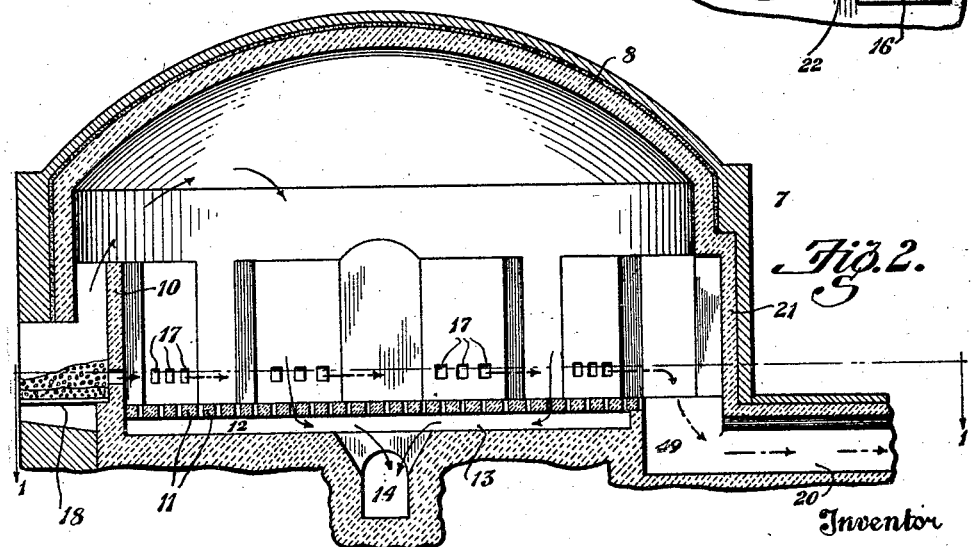
Figure 3:
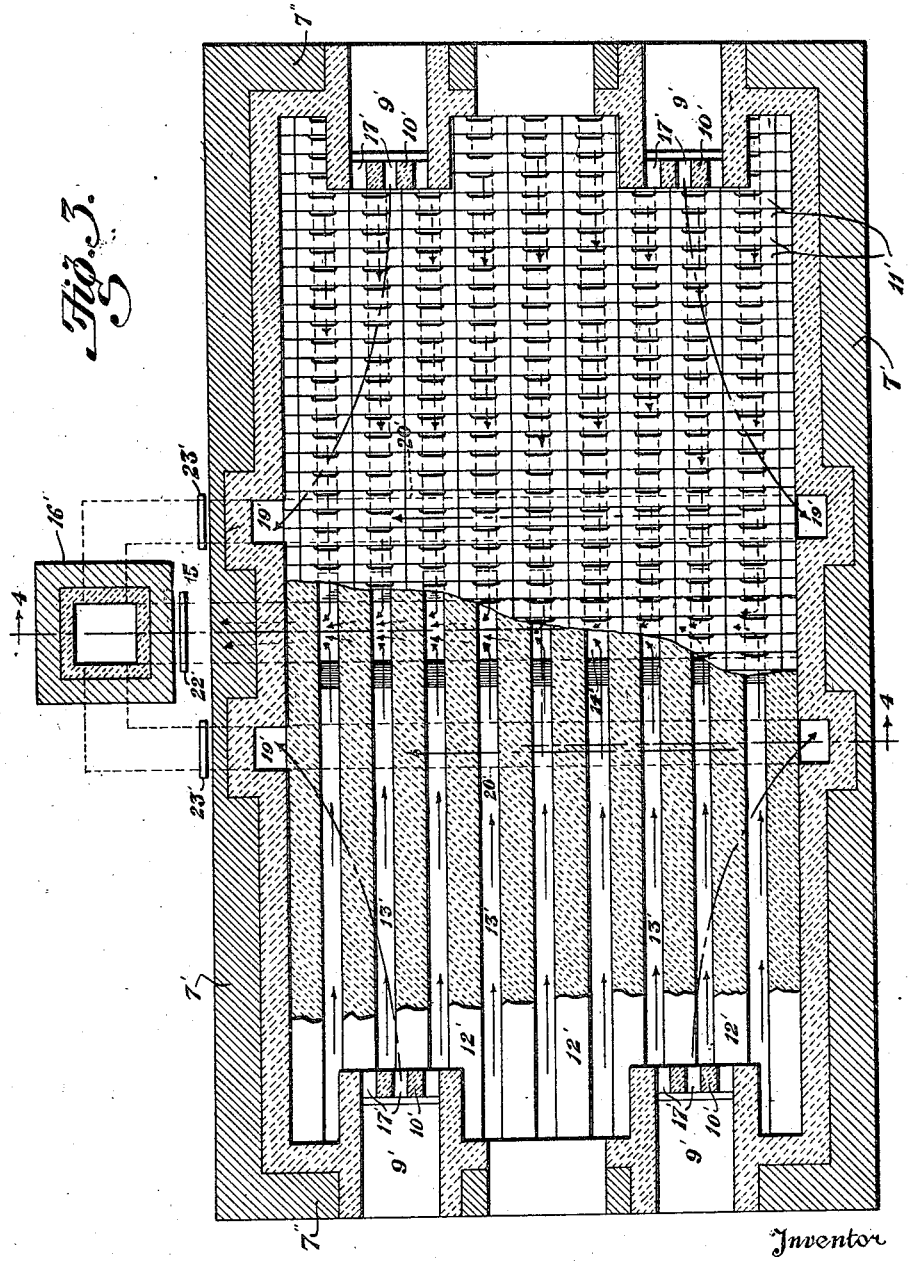
Figure 4:
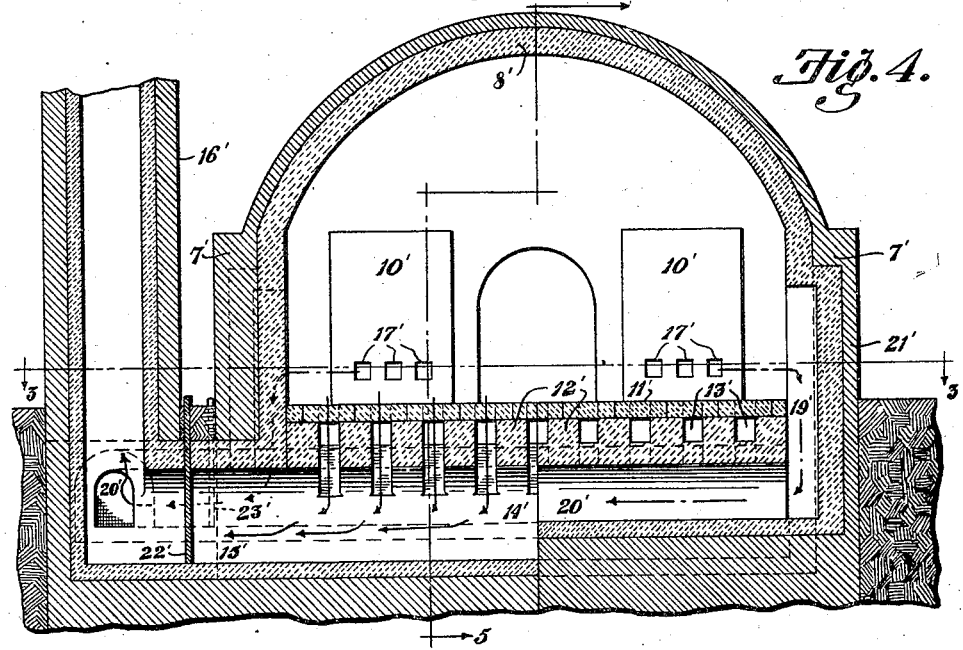
Figure 5:
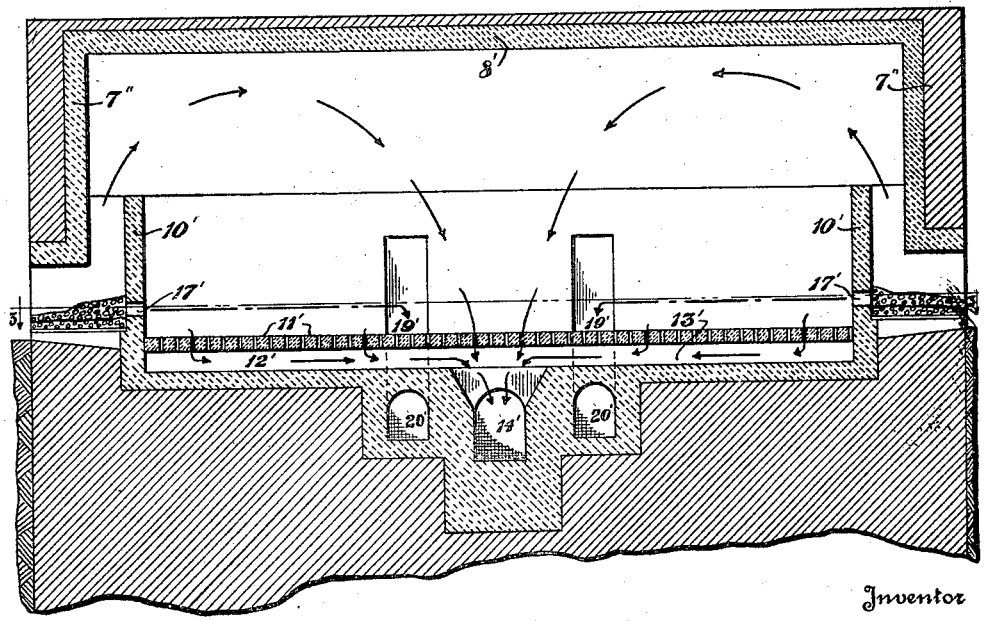

Figure 1 is a plan section of a round kiln, as on line 1—1, Fig. 2, with parts of the floor brick and flue walls broken away to show the arrangement of the floor system;

Fig. 2, an elevation section of a round kiln, as on line 2—2, Fig. 1;

Fig. 3, a plan section of a square kiln, as on line 3—3, Figs. 4 and 5, with parts of the floor brick broken away to show the arrangement of the floor system;

Fig. 4, an elevation cross section of a square kiln, as on line 4—4, Fig. 3; and Fig. 5, a longitudinal elevation section of a square kiln as on line 5—5, Fig. 4.

Similar numerals refer to similar parts throughout the drawings.

As shown in Figs. 1 and 2 of the drawings, a down draft round kiln may include a circular side wall 7, an arched top or crown wall 8, a plurality of fire boxes 9 each provided with a baffle or bag wall 10 spaced at an interval within the side wall 7; and the floor stem may include side notched floor bricks 11, resting on flue walls 12, spaced to form sub-flues 13, which communicate with a deep main flue 14 from which leads a tunnel 15 to a stack 16, in accordance with common and well known practice.

For the purpose of the present invention, the bag walls 10 are provided with one or more ports 17 located at an interval above the floor of the kiln and above the bottom or grate bars 18 of the fire box 10; so as to permit a portion, at least, of the products of combustion to pass directly into the kiln at a substantial distance below the top of the bag wall.

A deep well 19 is provided in one side of the kiln, extending downward from the floor thereof to an auxiliary tunnel 20 leading to the stack 16; and as shown in the drawings, the deep well 19 may be and preferably is located in the interval between two adjacent fire boxes, and may be constructed partly within the side wall of the kiln, in which may be formed a recessed panel 21 extending upward to about the height of the adjacent bag walls, which panel serves to increase the floor opening of the deep well 19, and permit a ready flow of the products of combustion into and through the same.

A damper 22 is provided for the main tunnel entrance to the stack in the usual manner, and a damper 23 is provided for the auxiliary tunnel entrance to the stack, so that either one or both of these tunnels may be partly or entirely closed and cut off from the stack as may be desired.

It is preferred to omit the ports 17 from the air bags of the fire boxes next adjacent to the deep well 19, to prevent a short circuiting of the draft from these fire boxes to the deep well; and it will be understood that in kilns of a larger size than the one illustrated in the drawings, one or more additional deep wells and auxiliary tunnels may be provided in the side of the kiln, as may be found necessary or desirable.

In the operation of the improved kiln, the main tunnel damper is entirely closed during the first two or three days while a charge in the kiln and the bottom thereof are heated to from 900° to 1000° F., during which period the auxiliary tunnel damper is opened so as to positively direct a substantial cross draft from all portions of the kiln to the floor opening of the deep well 19 at one side of the kiln; and the suction of this draft draws a certain portion of the products of combustion through the ports 17 in the bag wall from each fire box, it being understood that when solid fuel is used, care is taken not to close the ports during this period.

The cross draft thus induced by the pull of the stack, not only carries the moisture and products of combustion transversely through the bottom portion of the charge, as well as the upper portion thereof, but also heats the bottom as well as the top of the charge from the very beginning. The operation of the kiln by a cross draft is continued until the entire charge and the floor is heated to the desired temperature of 900° to 1000° F.; whereupon the main tunnel damper 22 is opened and the auxiliary tunnel damper 23 may be partly or wholly closed, as may be desired, after which the kiln is operated by a down draft induced by the pull of the stack during the remainder of the burning period.

In the operation of a twenty-seven foot round kiln, six feet high to the spring of the crown, provided with fire boxes, floor system and the improvements as illustrated and described, the burning of a charge of 40,000 nine inch fire brick can be completed in a total burning period of four and one-half days, as compared with six or seven days required for the same kiln without the improvements, and with a corresponding saving of some twenty-five percent of fuel; during which a pyrometer record sheet will show a continuous and straight line from the beginning at 75° to the finish at 2250° F. and the resulting product will be uniform in color and hardness from the top to the bottom of the kiln.

As shown in Figs. 3, 4 and 5 of the drawings, a down draft square kiln having ordinary side walls 7' and end walls 7'' with an arched top 8', and fire boxes 9' with bag walls 10' in each end, and with a floor system including side notched floor bricks 11' laid on flue walls 12', forming sub-flues 13' over a main flue 14' leading through a tunnel 15' to a stack 16'; may be provided with ports 17' in the bag walls and a plurality of deep wells 19' on each side communicating with auxiliary tunnels 20' adjacent to each side of the main flue 14', and having recessed panels 21' extending upward in the side walls; and by providing dampers 22' and 23' in the respective tunnels, it is evident that the square kiln can be operated first with a cross draft and finally with a down draft in the same manner as described for the operation of a round kiln.

It is not intended to limit the invention to kilns for burning fire brick, as illustrated and described herein for the purpose of explaining the invention; and it will be understood that the temperatures and other details of operation will be varied according to the different inherent characteristics of the clay products burned in the kilns.

I claim:

1. The method of kiln burning a charge of clay products, which consists in alternately directing a substantial cross draft and a down draft through the charge.

2. The method of kiln burning a charge of clay products, which consists in first positively directing a substantial cross draft through the charge and then inducing a down draft therethrough.

3. The method of kiln burning a charge of clay products, which consists in first positively directing a substantial cross draft through the charge until the same is heated to some 900° F., and then inducing a down draft therethrough during the remainder of the burning period.

4. A down draft kiln having fire boxes with bag walls in its sides, flues in its bottom, a tunnel and a stack for inducing a down draft in the kiln, there being ports in the bag walls and a deep well in one side, and an auxiliary tunnel communicating with the stack for inducing a cross draft in the kiln.

5. A down draft kiln having fire boxes with bag walls in its sides, flues in its bottom, a tunnel and a stack for inducing a down-draft in the kiln, there being ports in the bag walls and a deep well in one side, and an auxiliary tunnel communicating with the stack for inducing a cross draft in the kiln, with dampers for controlling the direction of the draft therein.

PETER JOSEPH LENGSHOLZ.